United States Patent [19]

Keim

[11] Patent Number: 4,481,438

[45] Date of Patent: Nov. 6, 1984

[54] HIGH VOLTAGE ELECTRICAL GENERATOR AND WINDINGS FOR USE THEREIN

[75] Inventor: Thomas A. Keim, Clifton Park, N.Y.

[73] Assignee: Electric Power Research Institute, Inc., Palo Alto, Calif.

[21] Appl. No.: 417,657

[22] Filed: Sep. 13, 1982

[51] Int. Cl.³ .............................................. H02K 3/04
[52] U.S. Cl. ..................... 310/201; 310/45; 310/60 A; 310/208; 310/213
[58] Field of Search ............... 310/180, 184, 198–208, 310/213, 254, 10, 52, 45, 60 A, 64, 196; 174/34; 336/187; 324/134

[56] References Cited

U.S. PATENT DOCUMENTS

| | | | |
|---|---|---|---|
| 3,453,468 | 7/1969 | Lund | 310/208 |
| 3,631,278 | 12/1971 | Snively | 310/208 |
| 3,743,875 | 7/1973 | Smith | 310/198 |
| 3,825,783 | 7/1974 | Duffert | 310/213 |
| 4,132,914 | 1/1979 | Khutoretsky | 310/184 |
| 4,151,433 | 4/1979 | Flick | 310/198 |
| 4,191,903 | 3/1980 | Brenner | 310/213 |
| 4,200,817 | 4/1980 | Bratoljic | 310/184 |
| 4,381,467 | 4/1983 | Grunewald | 310/213 |
| 4,404,486 | 9/1983 | Keim | 310/198 |

FOREIGN PATENT DOCUMENTS

| | | | |
|---|---|---|---|
| 207940 | 3/1960 | Austria | 310/213 |
| 1134454 | 8/1962 | Fed. Rep. of Germany | 310/213 |
| 115151 | 9/1981 | Japan | 310/208 |
| 963790 | 7/1964 | United Kingdom | 310/213 |
| 1395152 | 5/1975 | United Kingdom | 310/196 |

*Primary Examiner*—R. Skudy
*Attorney, Agent, or Firm*—Flehr, Hohbach, Test, Albritton & Herbert

[57] ABSTRACT

Disclosed is a winding for a high voltage electrical generator comprising a plurality of bundles of conducting member arranged whereby highest voltage is impressed on the innermost bundle and lowest voltage is impressed on the outmost bundles. The bundles of the winding are wrapped within sheets of electrical insulation with the cumulative insulation thickness being in approximate proportion to the voltage gradient across the bundles of the winding.

4 Claims, 14 Drawing Figures

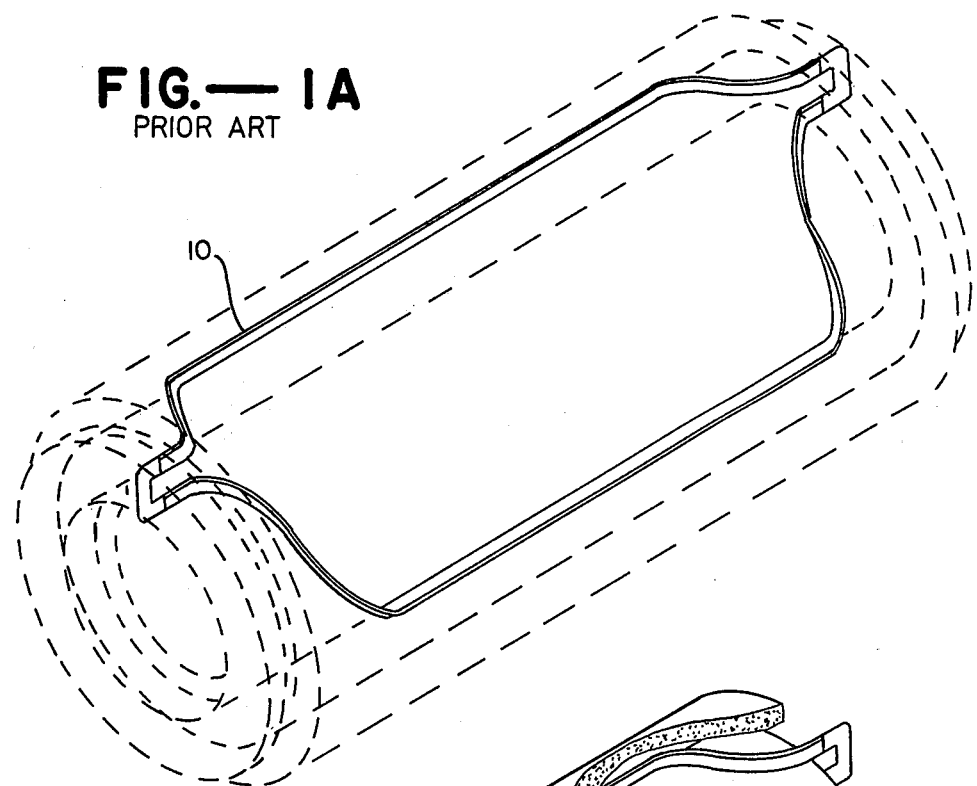
FIG.—1A
PRIOR ART
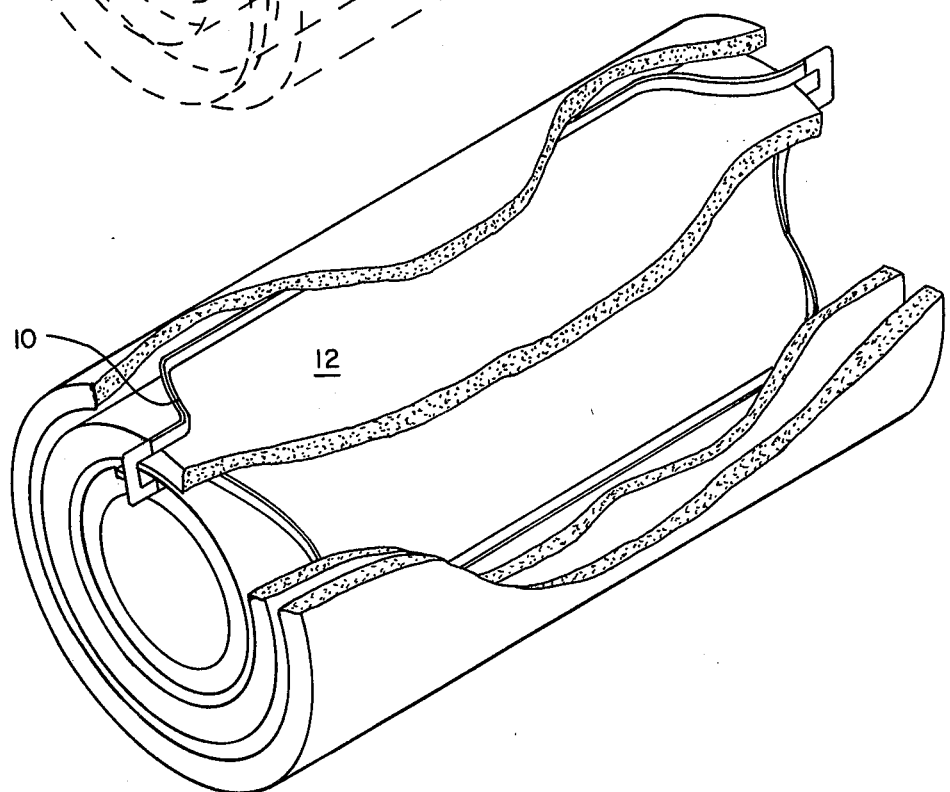
FIG.—1B
PRIOR ART

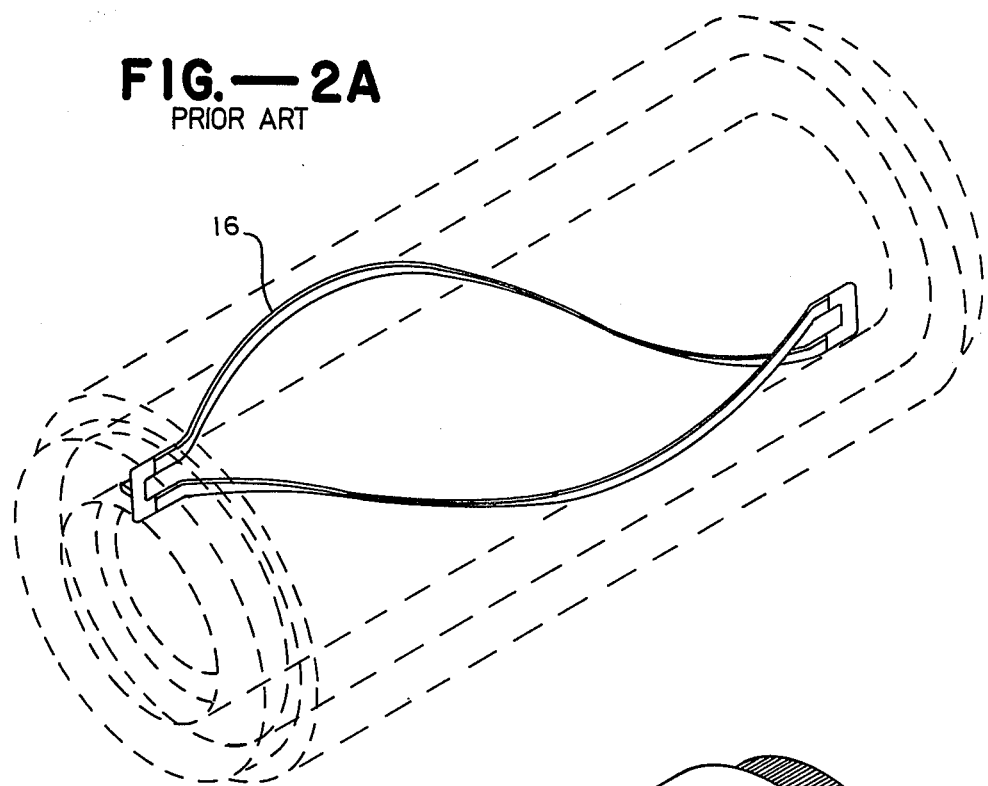
FIG.—2A
PRIOR ART
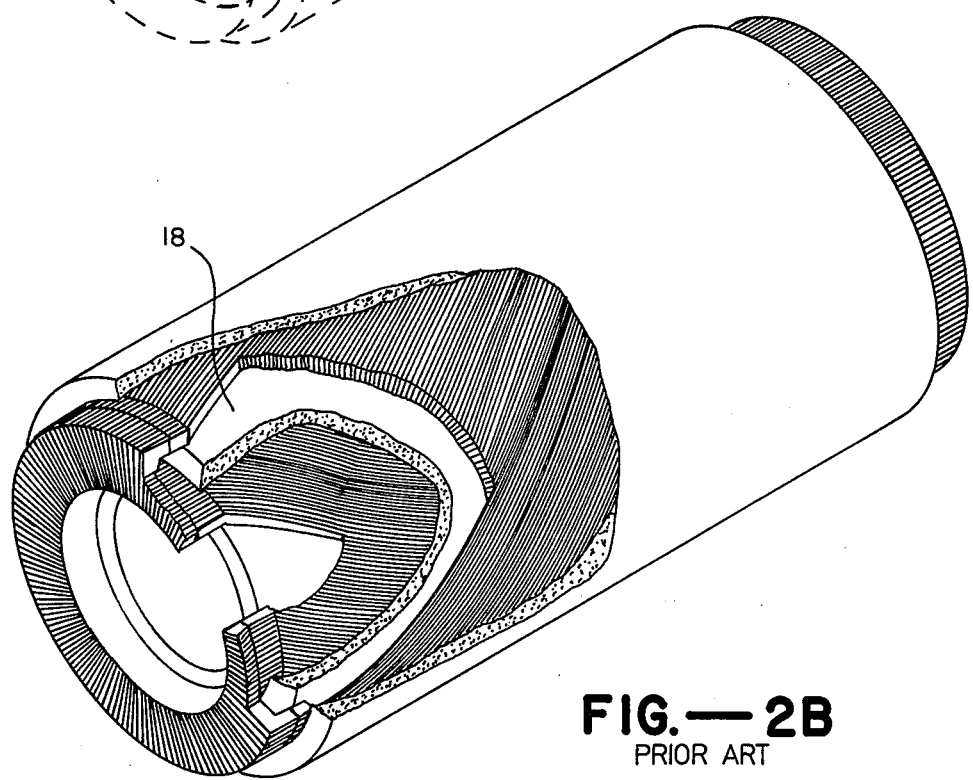
FIG.—2B
PRIOR ART

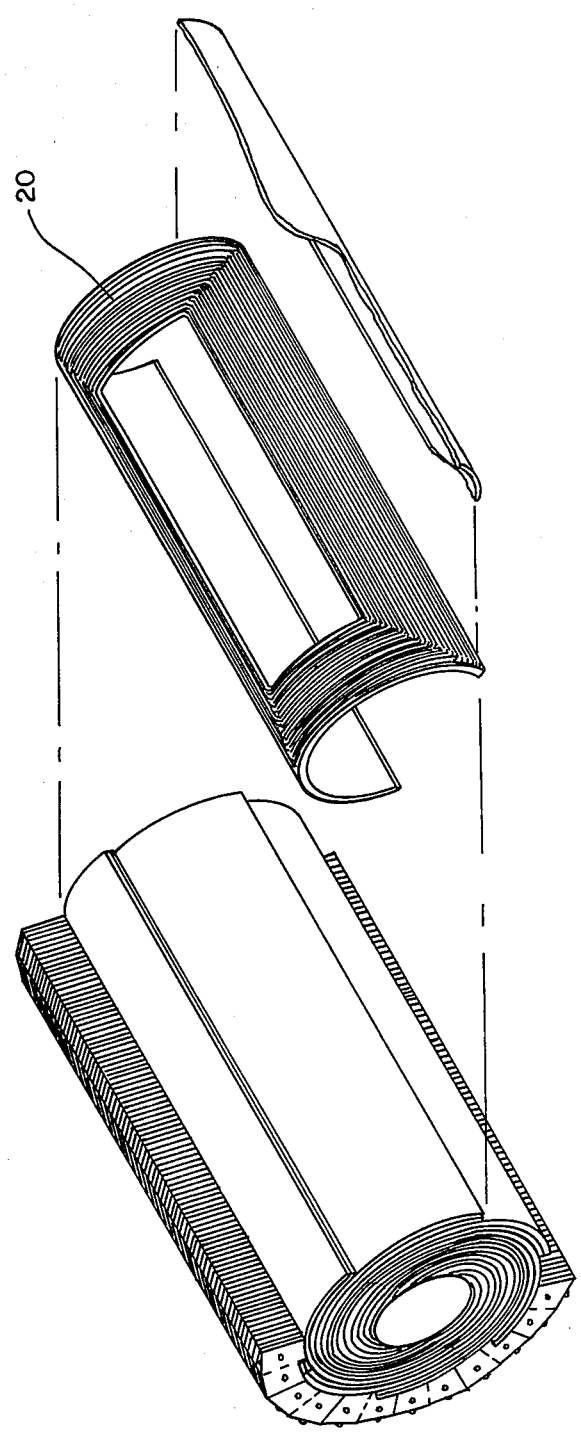
FIG.—3
PRIOR ART

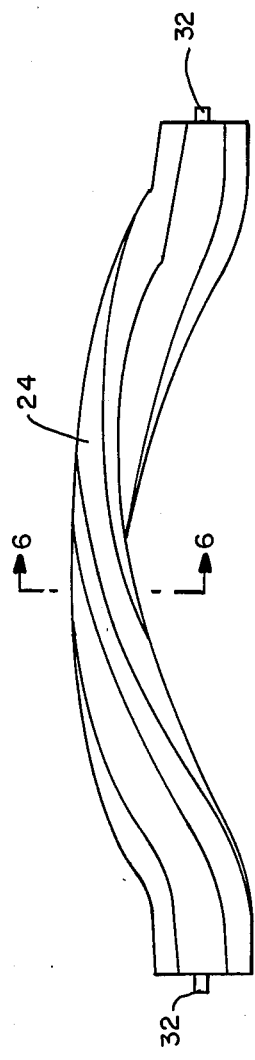
FIG.—4A
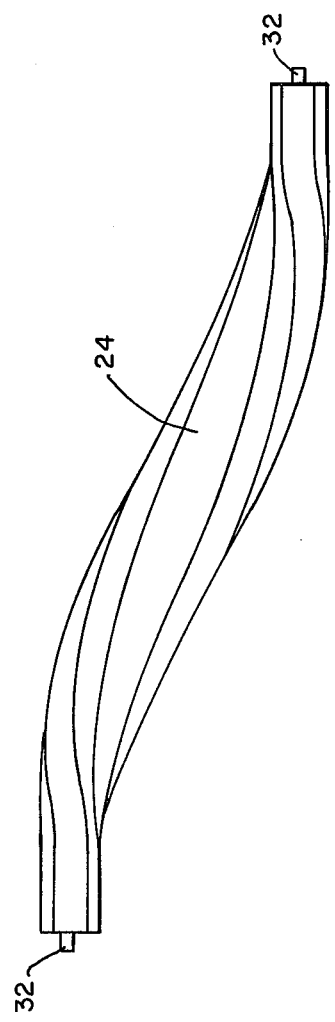
FIG.—4B
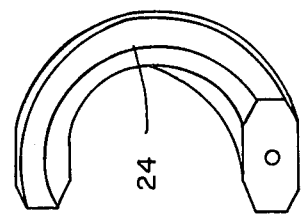
FIG.—4C

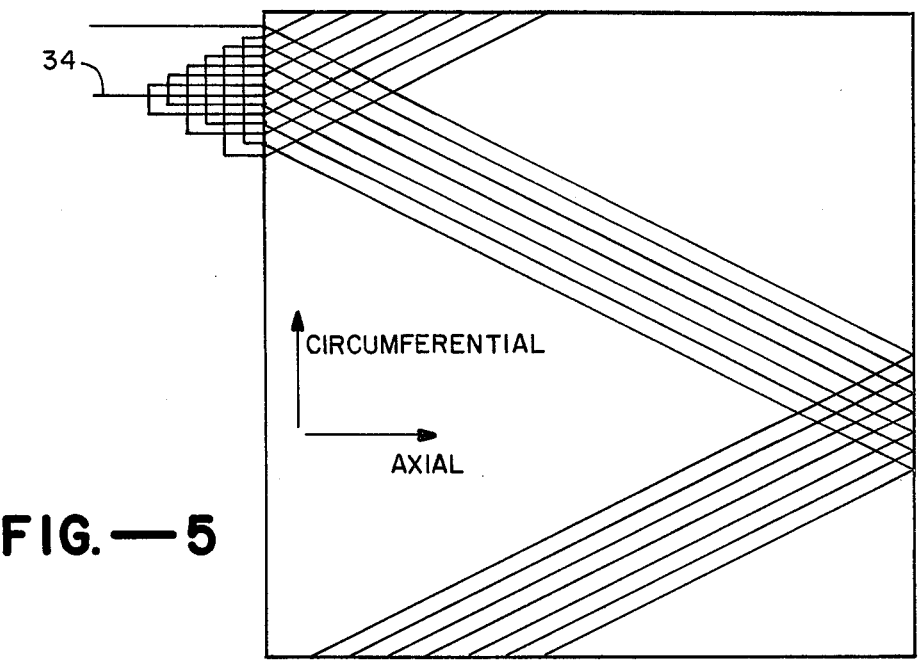
FIG.—5
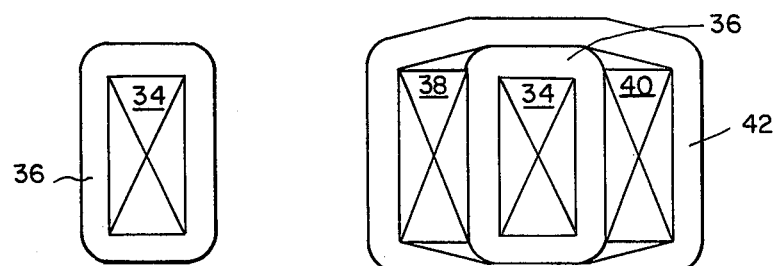
FIG.—6A
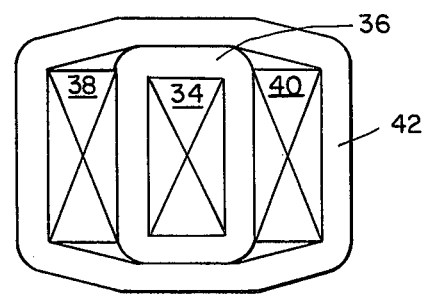
FIG.—6B
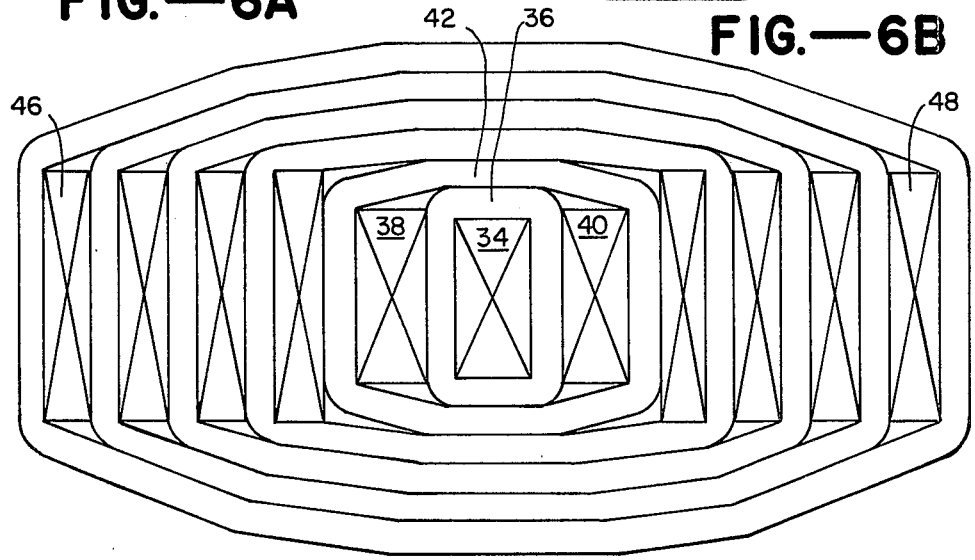
FIG.—6C

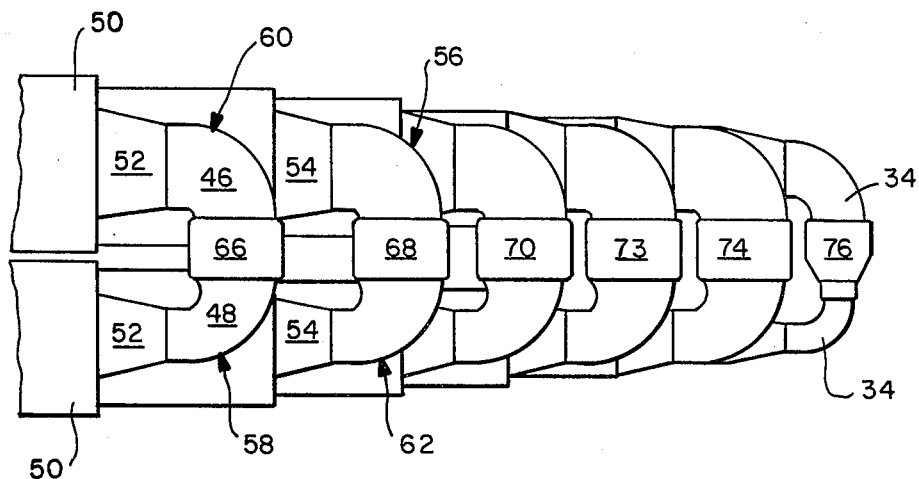
FIG.—7A
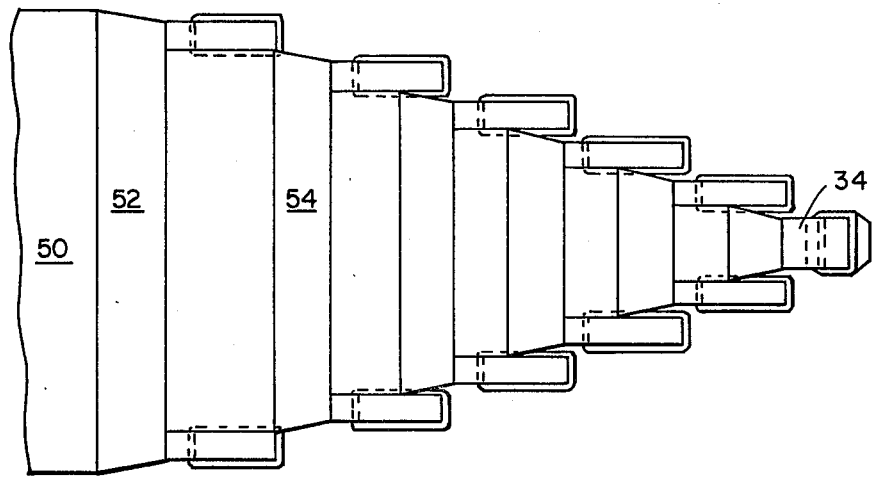
FIG.—7B

HIGH VOLTAGE ELECTRICAL GENERATOR AND WINDINGS FOR USE THEREIN

This invention relates generally to high voltage, superconducting electrical generators, and more particularly the invention relates to armature windings for such machines which are magnetically efficient and which can be readily insulated.

Alternating current generators with superconducting rotating field windings are being extensively studied for bulk central station power generation. Unlike conventional generators which employ ferromagnetic teeth in which windings are placed, such generators employ air gap windings for the stator armature. The potential for large AC machines with air gap windings has raised the possibility of generation at higher voltages including transmission line voltages.

The manufacture of airgap windings for high voltage generators requires a significant departure from conventional electric machine construction. A large number of non-conventional configurations have been proposed, some for airgap armatures in general and some with properties which render the windings especially suitable for very high volage generators.

British patent specification No. 1,395,152 discloses a superconducting alternating current generator in which stationary alternating current windings are carried by a non-magnetic hollow cylindrical support structure coaxial with the rotor. Each winding includes a pair of coaxial cylindrical layers of conductors with each conductor composed of one or more sections of helical information. Each turn of the winding includes at least one conductor of the first layer connected into at least one conductor of the second layer. No special provision is made for limiting voltages between adjacent coils.

U.S. Pat. No. 3,743,875 for "Polyphase Synchronous Alternators Having A Controlled Voltage Gradient Armature Winding" and U.S. Pat. No. 4,200,817 for "Delta Connected, Two Layer, Three Phase Winding for an Electrical Machine" disclose high voltage generators using windings which are delta connected to achieve a controlled voltage gradient and reduce the insulation required therewith. U.S. Pat. No. 4,151,433 for "Cooled Spiral Winding For Electrical Rotating Machine Stator" discloses a winding of the "spiral pancake" configuration which spirals outwardly about the axis of rotation of the machine. The spiral pancake coils when assembled provide a generally cylindrical winding configuration which can be well supported by the stator shield.

Copending application Ser. No. 220,204, filed Dec. 24, 1980, for "Star Connected Air Gap Polyphased Armature Having Limited Voltage Gradients At Phase Boundaries and Method of Making Same" discloses a winding arrangement in which the coils in each phase group are connected in a predetermined manner in respective phase belt regions such that the outermost coils of one side of the phase belt regions are serially connected by jumper leads in series electrical relationship with the outermost coils of the other edge of the phase belt region. The remaining coil or coils of the phase belt region are serially interconnected with each other and with the outermost unconnected coils in a like alternating manner commencing from the outermost and continuing to the innermost coil of the phase belt region. The unconnected lead of the coil or coils at the first edge of the phase belt region forms the nuetral terminal connection of the phase winding in a star or wye circuit comprised of other similarly formed phase windings, and the unconnected lead of the last coil or coils remaining at the middle of the phase belt region forms the line terminal for the multiple coil phase windings to thereby minimize voltage differences between turns of physically adjacent phase windings at the phase boundaries.

The present invention is directed to high voltage generator windings which have limited voltage gradients and which are readily insulated. Advantageously, the windings can be connected in either delta or wye configurations as described in the above referenced patents and pending patent application.

Accordingly, an object of the invention is an improved high voltage electrical generator.

Another object of the invention is an improved winding for use in a polyphase high voltage superconductive generator.

A further object of the invention is a high voltage winding having limited voltage gradients and which is readily insulated.

A feature of the invention is a coil having spiral windings constructed from half turn bars.

Another feature of the invention is the provision of sheet insulation about the turns of the coil to accommodate the voltage gradient across the coil.

Briefly, a winding module in accordance with the invention comprises a plurality of half turn bundles of conductive bars which are interconnected to form a coil phase winding. In a preferred embodiment each module and each bundle is a half turn helix, and the bundles of the modules are interconnected whereby the center bundle or pair of bundles is at maximum voltage.

Each conductive bundle comprises one or more mutually insulated halfturn bars, and each bar may comprise a single conduction path or a plurality of individually insulated and transposed conductors. One or more cooling tubes may be included in the bundle structure, and the complete assembly is preferably resin filled and molded for mechanical integrity.

Assembly of the bundles into a module proceeds from the center bundle or pair of bundles outwardly. The center bundle or bundle pair receives a layer of sheet insulation, and the next bundles are then placed on either side of the insulated structure. An additional layer of sheet insulation is applied over the assembly so formed, and the assembly continues by repetition until the entire module has been completed.

The order of connection of turns is selected so that when the armature is in operation, the outermost bundles are at the lowest potentials with respect to neutral, and other bundles progressing inwardly are at progressively higher potentials. The total thickness of insulation between bundles and between each bundle and ground is in approximate proportion to the potential difference therebetween.

The invention and objects and features thereof will be more readily apparent from the following detailed description and appended claims when taken with the drawing, in which:

FIG. 1A and FIG. 1B are perspective views illustrating conventional two layer lap windings for a polyphase machine.

FIG. 2A and FIG. 2B are perspective views illustrating two layer lap windings having helical coils in accordance with the prior art.

FIG. 3 is an exploded perspective view illustrating a spiral pancake armature winding in accordance with the prior art.

FIGS. 4A-4C are top, front, and side views of a helical module consisting of a plurality of bundle of bars in accordance with one embodiment of the invention.

FIG. 5 is a schematic of a two module winding for a polyphase machine using bundles in accordance with the invention.

FIGS. 6A-6C are section views along line 6—6 of FIG. 4A and FIG. 5 illustrating the assembly of bundles of a module in accordance with the invention.

FIG. 7A and FIG. 7B are a side view and top view, respectively, of the end portion of the winding of FIG. 6C.

As described above, in a superconducting machine the field ampere turns obtainable are so great that it becomes possible to dispense with the iron core of the stator winding while maintaining an effective flux density. Typically in such a machine a stationary alternating current winding is carried by a non-magnetic cylindrical support structure coaxial with the rotor, such as described in British Pat. No. 1,395,152.

An armature winding geometry, adapted for high voltage, is illustrated in the perspective views of FIGS. 1A and 1B. The winding 10 of a coil is referred to as a two layer lap winding with end turns laid out on a conical surface, the cone angle being reduced to zero and the end turns becoming helices on the surface of a cylinder. A thick layer of insulation 12 is inserted between the layers of the coil to accommodate the high voltage between coils in different layers, and the displacement of the ends of the conductors allows the end connections to be made directly and reduces the requirement for end windings to connect conductors lying at spaced positions around the winding.

FIGS. 2A and 2B are perspective views of another embodiment of a two layer lap winding in which each winding 16 includes two half turns of 180° of a circular helix. The helical two layer winding offers geometric regularity which is regarded as the principle benefit, and the simple cylindrical form of the interlayer space is a major benefit. Again, a thick cylinder 18 of insulating material is provided between the two layers.

FIG. 3 is an exploded perspective view of another construction for high voltage windings. Each of the windings such as winding 20 is a so-called spiral pancake which permits insulation between coils to be formed from sheets. While use of sheet insulation is advantageous, the efficiency of magnetic coupling is compromised in achieving this feature.

All the winding constructions described above with respect to FIGS. 1A, 1B, 2A and 2B share the common feature that coils at highly different voltages are separated by thick solid insulators of relatively simple construction. The coils also share the feature of potential for circumferential electrical creepage failure along the surface of a phase belt, which is presumed to be prevented by limitation of voltage or by detailed design of the creep interface.

In order to avoid large voltages at the circumferential phase boundaries, the configurations with cylindrical insulators may be delta connected as described in U.S. Pat. Nos. 3,743,875 and 4,200,817, supra. Alternatively, the windings can be connected in a wye configuration as disclosed in co-pending application Ser. No. 220,203, supra.

In accordance with the present invention a coil module consisting of bundles of conductive bars is provided for use in a very high voltage generator which has an electromagnetically efficient shape, is easily supported against the full range of mechanical loads, and with coils having a uniform voltage gradient across the coil and which are readily insulated for very high voltage.

FIGS. 4A-4C are top, side, and end views, respectively, of one of the basic modules 24 of a winding in accordance with this invention. A layer of the winding comprises a plurality (typically 6, for a three-phase two-pole machine) of such modules. The complementary layer of the winding, lying at a radial location outside of the radius of the layer formed by modules like the one shown is comprised of a like number of modules having a shape generally like that shown, but with a helix of opposite direction. While the module in accordance with the invention is particularly advantageous with helical windings, as shown, the invention can be employed with windings of other shapes. As will be described further hereinbelow with reference to the section view of FIG. 6C taken along line 6—6 of FIG. 4A, each module 24 consists of a plurality of bundles of conducting members or bars.

In its simplest embodiment each bundle comprises a single bar, and each bar may comprise a single conductor or a plurality of conductors which are individually insulated and transported in forming the bar. Further, one or more coolant tubes 32 may be included in the module structure with the complete assembly resin filled and molded for mechanical integrity.

The number of bundles of conducting bars in each phase belt layer may vary over a wide range, but the range of 7 to 14 is presently the most practical. Further, to meet the geometric constraints on module layout, it is convenient to make the bundles of different cross sections. When rectangular bars are employed, some variation can be achieved by altering the stacking of bars within a bundle.

Consider now the helical winding consisting of two modules such as shown in FIGS. 4A-4C and illustrated schematically in FIG. 5. In accordance with the invention, the assembly of bundles into a module spiral winding proceeds from the center outwardly. As illustrated in FIGS. 6A-6C (section views along the line 6—6 of FIGS. 4 and 5) the procedure begins with a center bundle 34 (or a pair of bundles, depending on whether the module contains an odd or even number of bundles). The center bundle 34 receives a layer of sheet insulation 36 which may be a mica-resin or oil filled paper tape.

Next, as shown in FIG. 6B additional bundles 38 and 40 are placed on either side of the center bundle 34, and an additional layer of sheet insulation 42 is applied around the assembly so formed. Assembly continues by repetition of this process until the entire module has been completed as shown in FIG. 6C.

In accordance with a feature of a preferred embodiment, the bundles become taller and thinner progressing outwardly from the center of the module to the end bundles 46 and 48. The only limitation on the use of taller bundles is that the sheet insulation which is applied around the bundles must not follow a concave path. This limitation prevents the radially inner surface of the module from conforming closely to a circle, and while this restriction may appear to be wasteful of space, the modular phase belt construction is equal in spatial utilization to a wound armature with monolithic cylindrical insulators.

Advantageously, the order of connection of turns in the phase module is selected so that when the armature is in operation the outermost bundles are at the lowest potentials with respect to neutral and the other bundles progressing inwardly are at progressively higher potentials, with the highest potential being at the center bundle 34. The total thickness of insulation between bundles and between each bundle and ground is seen to be in approximate proportion to the potential differences. Importantly, the layers of insulation are approximately perpendicular to the directions of high electrical stress which is conducive to achieving good performance from the insulation. The outer surface of the module is preferably coated with a semiconducting material which may be kept at neutral potential, thus avoiding electrical stress concentration outside of the module. Such a coating also facilitates mechanical support of the module within the stator cylinder. The armature is assembled by bringing together all of the modules with appropriate mechanical structures between them.

FIG. 7A and FIG. 7B are a side view and a top view, respectively, of the connection region of one axial end of the winding shown schematically in FIG. 5. As shown in FIG. 7A, bars of a radially inner bundle 58 are joined to bars of a radially outer bundle 60. As shown in the top view of FIG. 7B, all conductors follow the axial direction in the connection region. Successive layers of the module, from the outside toward the innermost bundle, are terminated at different axial locations progressing away from the machine center. First the conductive outer sheath 50 is terminated, and then over a distance of several inches the outer layers of sheet insulation 52 are tapered from full thickness to zero, thus exposing the outer bundles of bars 46 and 48.

Connections between bars in bundle 46 and the corresponding bars in bundle 62 can be made by conventional metal joining techniques, as can connections between bundle 48 and the corresponding bars from the inner layer. The second layer of sheet insulation 54 is tapered to zero, permitting the second bundles of bars 56 and 62 to be connected. Remaining layers are terminated in a similar manner.

Provision can be made for the connection of inflow and egress of a coolant through ports (not shown) in parts 66, 68, 70, 73, 74 and 76, assuming that the individual bars are to be cooled. Alternatively, a coolant can be provided at the connector to flood the end of the generator with a dielectric cooling fluid.

By so assembling bundles of conducting bars to form a winding module, the voltage different between adjacent bundles can be minimized with the high voltage terminal centrally located in the winding and the outer bundles of the winding being at lowest voltage potential. The winding bundles are readily insulated by sheet insulation to accommodate the voltage gradient across the winding.

While the invention has been described with reference to a specific embodiment, the description is illustrative of the invention and is not to be construed as limiting the invention. Various modifications and applications have been suggested and other modifications and applications may occur to those skilled in the art without departing from the true spirit and scope of the invention as defined by the appended claims.

What is claimed is:

1. For use in a high voltage electrical generator, a multilayer winding comprising a plurality of half-turn helical modules, each of said modules comprising a plurality of half-turn bundles of conducting bars and sheet insulation means wrapped around said bundles, said bundles of conducting members interconnected to form complete turns of said winding, the innermost bundles of each of said modules are at highest voltage potential and the outermost bundles of each of said modules are of the lowest voltage potential, whereby a generally uniform progression exists between said outermost and said innermost bundles, the sheet insulation means wrapped about said bundles providing insulation in approximate proportion to the voltage difference.

2. The winding as defined by claim 1 wherein each of said half-turn conductive bundles includes a single conductive bar.

3. The windings as defined in claim 1 wherein each of said half-turn conductive bundles includes a plurality of conductive bars.

4. The winding as defined in claim 1 wherein said modules include conduit means for a coolant.

* * * * *